June 4, 1935.  C. C. SWETENHAM  2,004,019

POWER TRANSMISSION

Filed July 5, 1932   3 Sheets-Sheet 1

Inventor
Charles C. Swetenham
By his Attorneys,
Baldwin & Wight

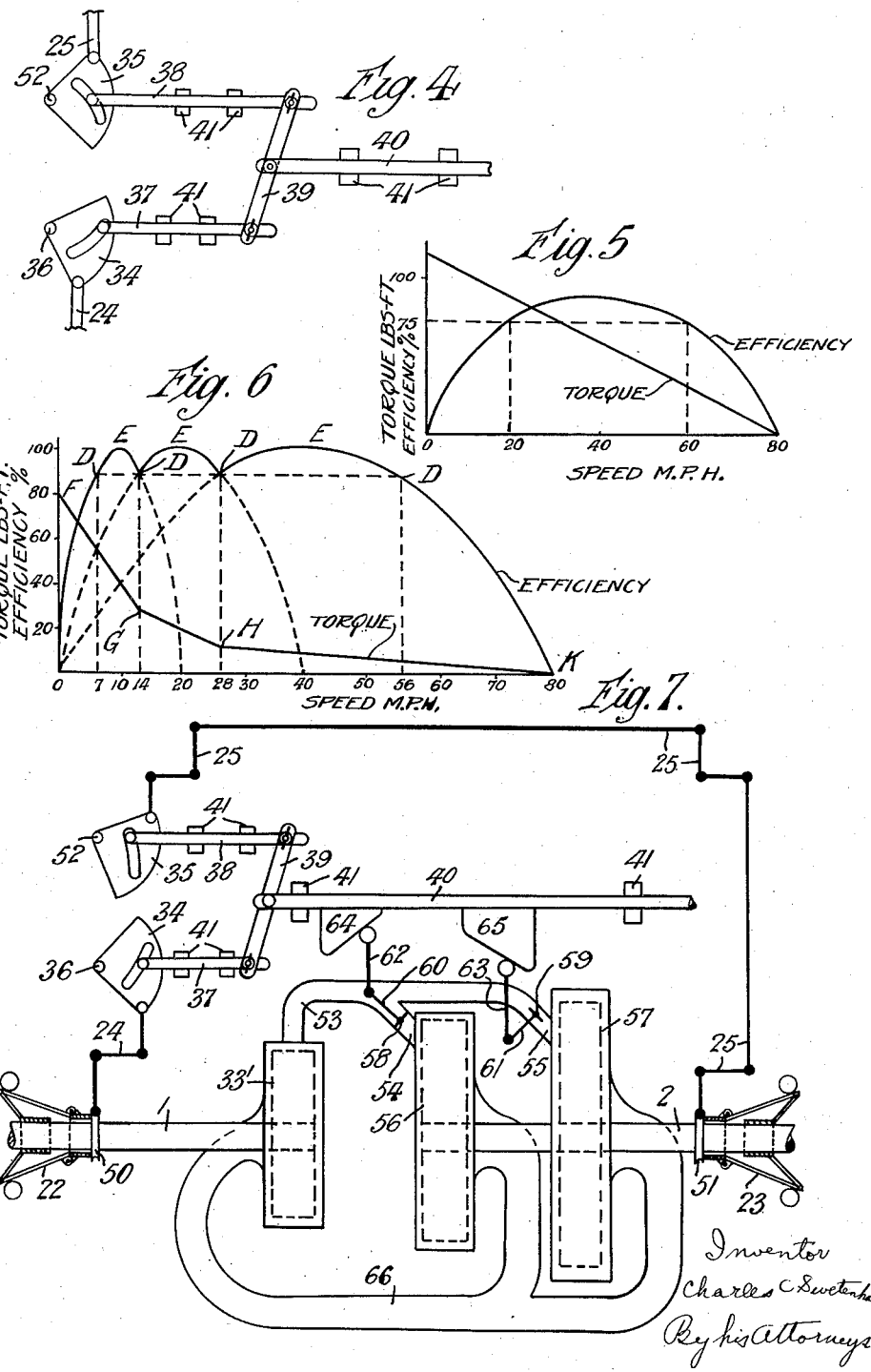

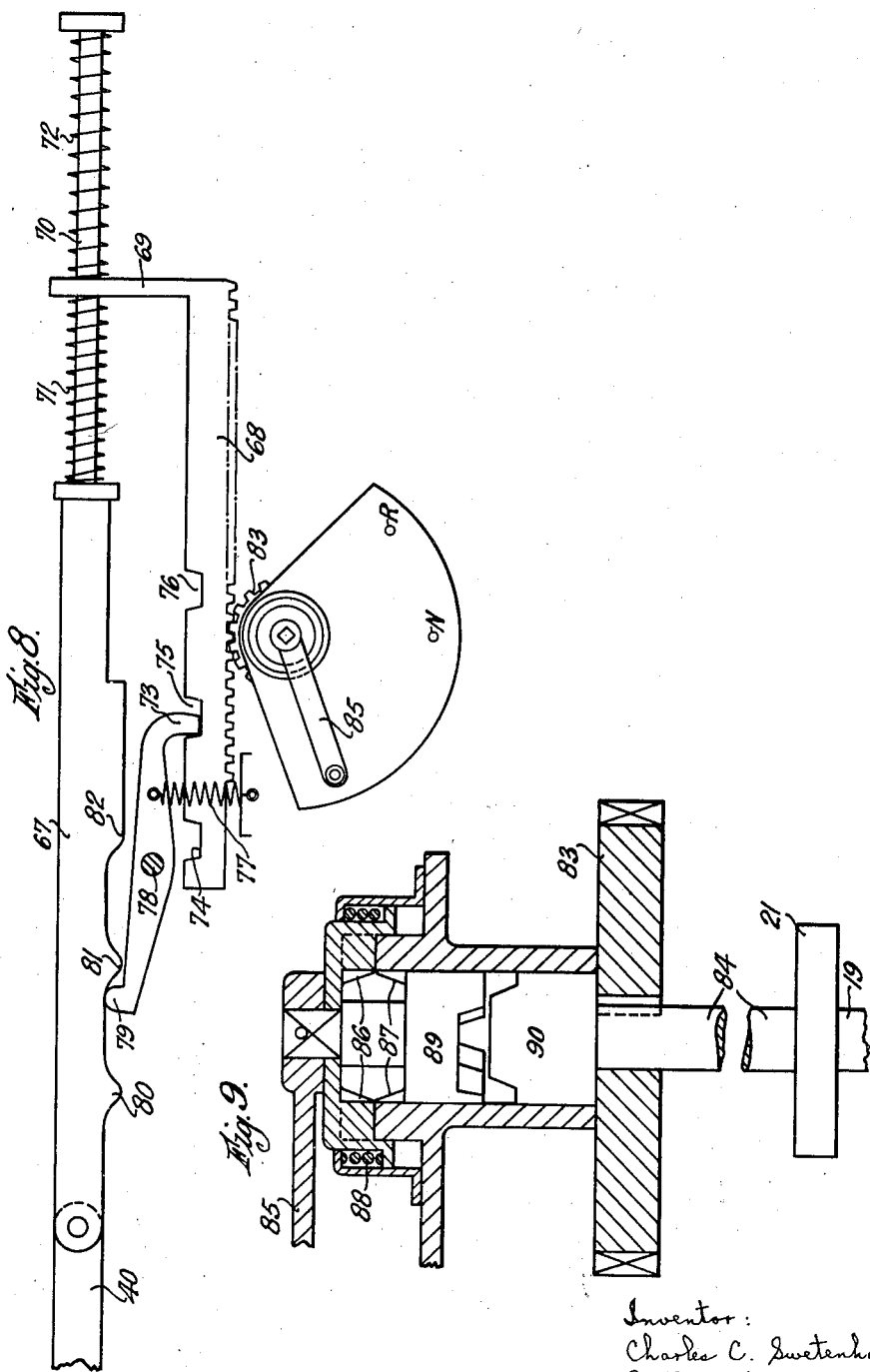

Patented June 4, 1935

2,004,019

UNITED STATES PATENT OFFICE 2,004,019

POWER TRANSMISSION

Charles Condon Swetenham, Sherborne, England, assignor to himself, Clement Alfred Swetenham, and Leslie Mary Swetenham, all of Sherborne, Dorsetshire, England Application July 5, 1932, Serial No. 620,911
In Great Britain July 14, 1931

6 Claims. (Cl. 60—54)

The invention relates to power transmission, and is more particularly directed to what may be called a "self-regulating torque transformer."

According to the invention the energy applied to the driving shaft is converted into hydraulic energy of a fluid, and the last named energy is reconverted into mechanical energy at the driven shaft by a multiple turbine, the various elements of which are selectively supplied with the fluid under automatic control in dependance on the speeds of the driving and driven shafts.

It is understood that the hydraulic energy of the fluid may be due to its pressure head or velocity head or to a combination of the two.

The invention may be put into practice by means of a construction in which an impeller is mounted on the driving shaft and serves to convert the energy applied thereto into hydraulic energy. The fluid is suitably conveyed to the driven element which comprises a plurality of hydraulic turbines such as impulse wheels. In the lead conveying the fluid to the driven element there is a plurality of valves severally controlling the inlets to the various turbines, and these valves are selectively controlled by a governor on the driven shaft so that one or more of the turbines are actuated, those selected for actuation being those which are most efficient at the particular speed at which the driven shaft is running.

A governor on the driving shaft also exercises a control which is combined with that of the first named governor, so that the selection of the turbines is partly dependent on the speed of the driving shaft and partly on that of the driven shaft. The turbine discharge is connected to the impeller by a return lead for the fluid. Variations in the power transmitted are normally effected by varying the speed of the driving shaft.

The accompanying drawings show further embodiments of the invention adapted for use more particularly on a motor vehicle.

Figure 1:
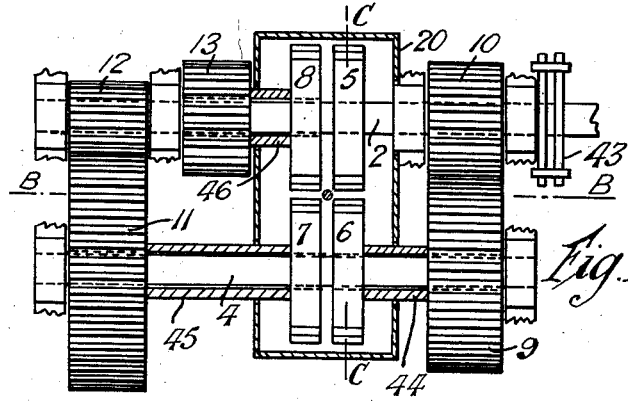
Figure 2:
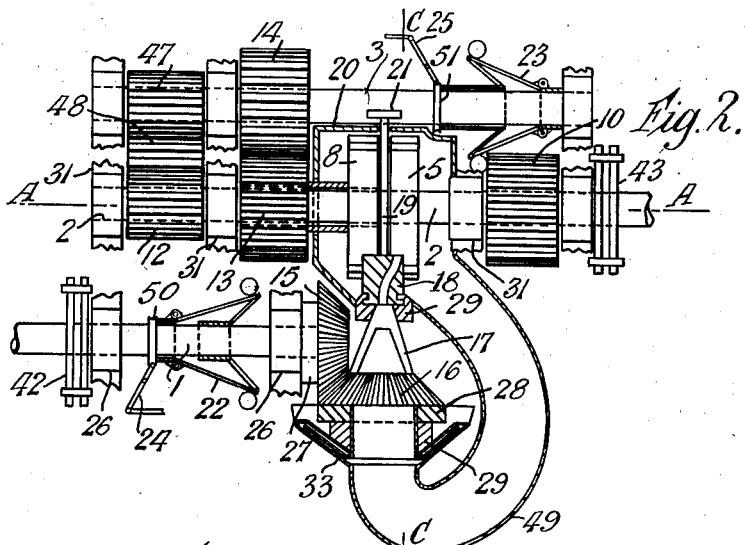
Figure 3:
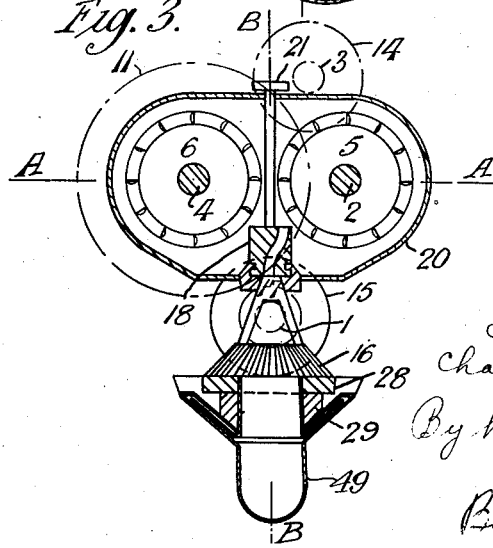

In the drawings, Figure 1 is a sectional plan of the torque transformer using impulse turbines, and is taken on the line A—A of Figures 2 and 3; Figure 2 is a sectional elevation of the same taken on the line B—B of Figures 1 and 3; Figure 3 is a sectional end elevation of the same taken on the line C—C of Figures 1 and 2; Figure 4 is a detail relating to the governors; Figures 5 and 6 are curves explaining the principle of the invention, Figure 7 is a diagrammatic drawing showing the torque transformer with reaction turbines and valves, Figure 8 is a diagrammatic elevation of connecting means between the governor gear of Figure 4 and the jet deflector of Figures 1 to 3, and Figure 9 is a sectional end elevation of a part of the same on a larger scale.

For the sake of clarity in Figures 1 to 4, certain details have been omitted from one or other view and other details are shown displaced from their correct position.

Referring to Figures 1 to 3, the driving shaft 1 is connected by a flexible coupling 42 to the engine (not shown). The shaft 1 is provided with journal bearings 26 and a thrust bearing 27, and drives through bevel wheels 15, 16 a pump impeller located in the casing 17 and suported by a journal bearing 29 and thrust bearing 28. The precise form of impeller is not shown but will be determined in accordance with the usual practice of pump design.

The casing outlet communicates with a deflector 18 which is a block rotatable about the axis of the casing outlet, and provided with a hole as shown. The deflector thus receives the jet delivered by the impeller and displaces it by a small amount parallel to itself. The direction of this displacement is varied by the rotation of the deflector for a purpose which will be explained hereinafter.

The driven shaft 2 is mounted in bearings 31 and drives through a flexible coupling 43. An impulse wheel 5 and pinions 10 and 12 are fast with the shaft 2. A fixed shaft 4 has two sleeves 44 and 45 rotatably mounted on it. The sleeve 44 is fast with an impulse wheel 6 and pinion 9 which latter engages the pinion 10, while the sleeve 45 is fast with an impulse wheel 7 and pinion 11, the latter engaging the pinion 12. A similar sleeve 46 on the shaft 2 carries the impulse wheel 8 and the pinion 13. The latter engages a pinion 14 on the reverse shaft 3 which carries a pinion 47 driving through intermediate pinion 48 the pinion 12 on the shaft 2.

The four impulse wheels 5, 6, 7 and 8 are symmetrically situated about the axis of the deflector 18 and it will be seen that by rotating the deflector the jet can be brought into play on any one of the four impulse wheels. Moreover, on account of the differing dimensions of the various pinions it will be seen that the speed ratios between the shaft 2 and the impulse wheels 5, 6 and 7 are different, and that the speed ratio between the shaft 2 and the impulse wheel 8 is of the opposite sign to the others, so that for a given peripheral speed of the impulse wheel on which the jet impinges at any time, three speeds forward and one reverse are obtained on the shaft 2.

The impulse wheels are enclosed in a casing 20 provided with a branch 49 which forms a return duct and sump for the liquid from which it is again taken by the pump. 33 is the seal for the impeller of the pump.

On the shaft 1 a governor 22 is fitted which is shown conventionally as a flyball governor moving the grooved ring 50 along the shaft in dependence on the speed, this movement being transmitted by lever gear 24. A governor 23 indicated similarly is associated with the shaft 2. Actually this governor is shown mounted on the shaft 3 which runs at a speed always proportional to that of shaft 2 because of the connection by the pinions 12 and 47. The governor 23 transmits its movement by sliding ring 51 and lever gear 25. The actual construction of the governors and connecting gear may be as desired. Figure 4 shows diagrammatically how the movements of the two governors may be combined. Rods 37, 38 and 40 slide in bearings 41. The two former engage slots near the two ends of a link 39 while rod 40 is connected to an intermediate point. Rod 37 is moved by a slot in a cam quadrant 34 pivoted at 36 and rocked about the pivot 36 by the lever or link gear of which one end is indicated at 24. Rod 38 is controlled by cam quadrant 35 pivoted at 52, the quadrant also having a slot and being moved by lever or link gear, of which one is shown at 25. The other ends of the gears 24 and 25 are shown in Figure 2. The rod 40 is thus moved in dependence on the speeds of both driving and driven shafts and is connected to the wheel 21 of Figures 2 and 3 by trip mechanism adapted to effect rapid movement of the deflector 18 from a position of cooperation with one of the turbine wheels to positions of cooperation with the other turbine wheels, the construction and arrangement of the trip mechanism being such as to advance the deflector step-by-step to positions of cooperation with the three "forward" turbine wheels, and to bring the deflector to rest in a position of cooperation with the turbine wheel whose characteristics are such that it will be the most efficient at the speed at which the vehicle is moving at a given time.

This trip mechanism may be of the type including one or more latches or pawls adapted to engage teeth or depressions for locking the deflector in a position determined by the vehicle speed, governor controlled spring loaded means for moving the deflector to the next position when the pawl is disengaged from the tooth or depression, and governor controlled means for releasing the pawl at given speeds. Trip mechanism of this general type used in connection with meshing gear transmission is disclosed in United States Patent, 1,185,528, to Oddie, of May 30, 1916. An adaptation of this mechanism suitable for the purposes of the present invention is disclosed in Figures 8 and 9, although it will be understood that the details of this mechanism per se do not constitute the invention claimed herein.

Referring to Figures 8 and 9, the rod 40 is linked to a bar 67 so that the latter executes the same horizontal movements as the bar 40. The bar 67 is coupled to a rack 68 which is also slidable in a horizontal direction. This coupling is through ratchet or trip mechanism which will now be described. The object of this mechanism is to cause a rapid change over of the jet from one impulse wheel to another at the appropriate combination of shaft speeds.

The rack 68 has a vertical projection 69 with an eye through which a horizontal extension 70 of the bar 67 passes. Springs 71, 72 tend to keep the part 69 central on the extension 70, but permit some deviation therefrom. A pawl 73 engages either one or the other of three notches 74, 75, 76 in the back of the rack 68 and is normally held in engagement by a spring 77. The pivot 78 of the pawl and the end of the spring 77 are attached to stationary parts of the vehicle.

The pawl has a rearward extension with a projection 79 which contacts with the bar 67. At appropriate locations downward projections 80, 81, 82 are provided on the bar 67 so that when the governor gear has moved the bar 67 by a predetermined amount the pawl 73 is lifted out of engagement with the rack 68 permitting the spring 71 or 72 as the case may be to move the rack to the next position where the pawl 73 on a slight further movement of the bar 67 drops into the next notch of the rack. The rack 68 meshes with a pinion 83 shown in Figure 8 at the medium speed position. In Figure 9 the pinion is shown as at a forward speed position under governor control and from this figure it will be seen that it is fast with a shaft 84 driving the wheel 21 on the shaft 19.

The operation of the fluid gear is explained in Figures 5 and 6 in which Figure 5 relates to a single impulse wheel. This gives the variation of efficiency in terms of its maximum value at various speeds in miles per hour and a torque speed curve in lbs.—ft. These units are taken for a particular example but the curves may be regarded as being in arbitrary units for any range of speed and any maximum torque. It will be seen that over a speed range of 3 to 1, namely from 20 to 60 miles per hour, the efficiency is at least 75% of the maximum. Figure 6 shows how these curves are combined in using three forward speeds. The curves are here plotted against speed in m. p. h., the full line D—E and so on being the combined efficiency curve the ordinates having the same significance as in Figure 5. It will be seen that between 7 and 56 m. p. h. only the tops of the efficiency curves are used, the efficiency at the points D being practically 90% of the maximum efficiency at the points E. The dotted parts of the efficiency curves are the parts which are not used because the deflector sets another impulse wheel into operation at the speed in question, so that the efficiency is kept high. The broken line F G H K shows the torque. It will be seen that the starting torque is 15 times the torque at 56 m. p. h. The speeds and the speed ratios are merely taken as typical. In one size of gear it is found that the actual efficiency at the points E is about 80%, and at the points D about 70%.

The above description of automatic control relates of course to the three forward speeds only. For stopping and reversing, a hand-operated lever gear is provided, which in one position leaves the wheel 21 free to be operated by the governor gear for forward running and when moved from this position engages a member fast with the wheel 21. The wheel 21 is then controlled by the hand operated lever which in a further position sets it so that the jet passes between impulse wheels 5 and 8 for "free engine", and in the third position places the wheel 21 in such a position that the jet impinges on the wheel 8 for reverse.

This gear is shown in Figures 8 and 9. A hand lever 85 is fast with a face cam 86 cooperating with a stationary face cam 87. When the lever 85 is moved a short distance towards the neutral position N, the chamfered teeth of the face cams become disengaged allowing the helical spring 88 to bring the claw coupling 89 fast with the lever 85 into engagement with the similar claw coupling 90 which is fast with the shaft 84. Further movement of the lever 85 then brings the disc 21 and accordingly the jet deflector 18 (Figure 3) into the neutral position N and the reverse position R successively as indicated in Figure 8.

It will be understood that before passing to the free engine and reverse positions the vehicle would be stopped by means of brakes. As a result the bar 67 would be brought by the governor gear to a position in which the projection 82 engages the nose 79 of the lever. This would occur at a certain low speed of the vehicle and any further reduction would merely cause the parallel part of the bar 67 beyond the projection 82 to slide over the nose 79, retaining the lever out of engagement with the rack 68. The pinion 83, and with it the wheel 21, can then be freely moved by means of the hand lever 85.

In the construction described the starting torque is extremely high and it has therefore been considered advisable in the interests of pinion teeth loadings to make the high torque or low speed impulse wheel the one with direct drive. Since, however, the number of rotating elements is so small, and the gears are permanently in mesh, this does not involve any serious drawback as it would in the case of the usual mechanical change-speed gears.

No appreciable hydraulic pressures are developed anywhere except between the impeller and the nozzle as the kinetic energy only of the fluid is used. A light casing can therefore be used and the sealing of joints will present no difficulty. In order to obtain a compact layout without excessive jet velocities, it may be found desirable to use mercury as working fluid, particularly when applied to motor cars.

The following advantages accrue from the use of the torque transformer described:—

A. Within the designed speed range of 8 to 1 the transformer automatically adjusts the speed of the driven shaft to the instantaneous value of the load without any alteration in the speed or load on the driving shaft.

B. The transformer is compensated for variations in the speed of the driving shaft so that such variations do not affect its efficiency.

C. The efficiency throughout the designed speeds of both driving and driven shaft shows only a 10 per cent. variation.

D. The power transmitted by the transformer (neglecting internal losses) depends solely on the driving shaft speed and is independent of the driven shaft speed.

E. The power absorbed by the driving shaft varies as the cube of its speed. It is therefore obvious that very little variation in the running speed of the engine is required, and that an engine capacity to pull at low speeds is superfluous.

F. There is no possibility that even the most serious shock in the transmission system will be transferred through the transformer to the engine.

G. Should the transmission be rotating at a greater speed than the maximum designed speed for the engine power being transmitted, the torque transmitted automatically decreases till, at about 50 per cent. above the corresponding maximum designed speed, the torque transmitted is nil. This is shown clearly in Figure 6 where 56 M. P. H. is the maximum designed speed at which the efficiency is not less than 90% of the maximum efficiency, and at a speed of about 50% higher, namely at 80 M. P. H. the torque becomes zero. It will thus be seen that a free-wheel characteristic is attained.

H. The sole driving control necessary will be a throttle or equivalent device controlling the power and/or speed of the engine. This will replace the normal accelerator and clutch.

I. The use of a clutch is superfluous, as at engine speeds only a little below the normal running speeds the car can be held on the brakes without harm either to engine or transformer.

J. The efficiency throughout the designed speed ranges varies between 70 and 80 per cent. It is held by the inventor that the more constant speed of the engine and the savings due to the free-wheel action will help to achieve economies in fuel consumption which will largely discount the superior arithmetical efficiency of the usual mechanical gear box.

An embodiment of the invention will now be described in which reaction turbines are used and valves are applied as the selecting means. This construction is shown in Figure 7, and to simplify the drawing two forward speeds only are shown. The driving shaft 1 and driven shaft 2 are provided as before with governors 22 and 23 respectively, and the movements of the governors are transmitted through mechanism 24 and 25, shown conventionally as a combination of bell crank levers and links, to the quadrants 34 and 35. Any other suitable transmission mechanism may of course be used. The quadrants 34 and 35 in their turn impart on any change of speed a longitudinal movement to the rods 37 and 38, and consequently to the rod 40 as described above in connection with Figure 4.

The impeller of a pump 33' is mounted on the shaft 1 and the discharge of this pump is connected to the pipe 53 which has two branches 54 and 55. The branch 54 is connected to the inlet of a reaction turbine 56, the rotor of which is mounted on the shaft 2. This is indicated by its relative diameter as the high speed turbine, and similarly the branch 55 feeds the low speed turbine 57 which also has its rotor mounted on the shaft 2. The branch pipes 54 and 55 have inlet valves 58, 59 shown conventionally as butterfly valves actuated by arms 60, 61. The valves may of course be of any suitable type such as that shown in United States Letters Patent 1,319,154 which discloses the well known Johnson valve. The arms 60, 61 are moved by suitably guided push rods 62, 63 engaging cams 64, 65 attached to the rod 40. The water or other fluid is returned by the pipe 66 to the pump 33' for continued circulation. It will be seen that the governor gear selectively opens and closes the valves 58 and 59 in dependence on the combined speeds of the driving and driven shafts 1 and 2; the shape of the cams 64 and 65 and the dimensions of the various parts will be so selected as to ensure the maximum efficiency over the working range and thus obtain most of the advantages enumerated above in the case of the torque transformer with impulse turbines.

The specific examples described are intended for use with motor vehicles, but the invention is not limited to such applications. Other possible applications are to locomotive work such as to steam locomotives for heavy gradients, or, in the case of Diesel electric locomotives, to take the place of the electrical plant.

What I claim is:—

1. A variable speed power transmission gear, in which the energy transmitted is converted into hydraulic energy and then reconverted to mechanical energy, comprising a driving shaft, a pump with its impeller mounted thereon, a driven shaft, a plurality of impulse turbines, gearing between the impulse turbines and driven shaft differing in ratio as between one turbine and another, a driving shaft governor, a driven shaft governor, means for operatively connecting the pump discharge relatively to one or other turbine, and a controlling connection between said selection means and both governors.

2. A variable speed power transmission gear, in which the energy transmitted is converted into hydraulic energy and then reconverted to mechanical energy, comprising a driving shaft, a pump with its impeller mounted thereon, a driven shaft, a plurality of impulse turbines, gearing between the impulse turbines and driven shaft differing in ratio as between one turbine and another, a driving shaft governor, a driven shaft governor, a jet deflector movable to bring the jet into operative relationship with one or other impulse wheel, and a connection between the jet deflector and the governors.

3. A variable speed power transmission gear, in which the energy transmitted is converted into hydraulic energy and then reconverted to mechanical energy, comprising a driving shaft, a pump with its impeller mounted thereon, a driven shaft, a plurality of impulse turbines, gearing between the impulse turbines and driven shaft differing in ratio as between one turbine and another, a driving shaft governor, a driven shaft governor, a jet deflector in the form of a rotatable block with an inlet hole on the axis of rotation and an outlet hole parallel thereto but excentric and located to direct the jet on to one or other of the impulse wheels according to its rotational position, and means for rotating the block to one or other position in dependence on the combined effect of the governors.

4. A variable speed power transmission gear, in which the energy transmitted is converted into hydraulic energy and then reconverted to mechanical energy, comprising a driving shaft, a pump with its impeller mounted thereon, a driven shaft, a plurality of impulse turbines, gearing between the impulse turbines and driven shaft differing in ratio as between one turbine and another, the gearing associated with one turbine being connected to give reverse rotation, a driving shaft governor, a driven shaft governor, means for operatively connecting the pump discharge relatively to one or other turbine, and a controlling connection between said selection means and both governors.

5. A variable speed power transmission gear, in which the energy transmitted is converted into hydraulic energy and then reconverted to mechanical energy, comprising a driving shaft, a pump with its impeller mounted thereon, a driven shaft, a plurality of impulse turbines, a return lead for the fluid constituting with the pump and turbines a closed circuit for the working fluid, gearing between the impulse turbines and driven shaft differing in ratio as between one turbine and another, the gearing associated with one turbine being connected to give reverse rotation, a driving shaft governor, a driven shaft governor, a jet deflector in the form of a rotatable block with an inlet hole on the axis of rotation and an outlet hole parallel thereto but excentric and located to direct the jet on to one or other of the impulse wheels according to its rotational position, and means for rotating the block to one or other position in dependence on the combined effect of the governors, and by hand to the reverse position.

6. A variable speed power transmission gear of the type in which the energy transmitted is converted into hydraulic energy and then reconverted to mechanical energy, comprising a driving shaft, a pump having its impeller mounted on said driving shaft, a driven shaft, at least three impulse turbine wheels operatively connected to said driven shaft for driving the latter in a forward direction, a jet deflector associated with said pump and being movable to direct the discharge thereof on to any one of said turturbine wheels, a governor arranged to be driven by one of said shafts, operative connections between said governor and said jet deflector whereby the deflector is moved into operative relationship with selected turbine wheels in dependence upon the speed of the governor, and quick-release mechanism interposed in the connections between the governor and the jet deflector for effecting rapid movement of the deflector from a position of cooperation with one of the turbine wheels to positions of cooperation with the other of said turbine wheels, said mechanism including latch means for arresting movement of said jet deflector as soon as the latter has moved to a position of cooperation with one of said turbine wheels and maintaining it locked in such position until said quick release mechanism functions again to move the jet deflector to a position of cooperation with the next turbine wheel.

CHARLES CONDON SWETENHAM.